(12) United States Patent
Agrawal et al.

(10) Patent No.: US 10,439,899 B2
(45) Date of Patent: Oct. 8, 2019

(54) SERVICE SUMMARY VIEW

(71) Applicant: NetScout Systems, Inc, Westford, MA (US)

(72) Inventors: Amreesh Agrawal, Bangalore (IN); Gaurava Kumar, Bangalore (IN)

(73) Assignee: NetScout Systems, Inc., Westford, MA (US)

(*) Notice: Subject to any disclaimer, the term of this patent is extended or adjusted under 35 U.S.C. 154(b) by 192 days.

(21) Appl. No.: 15/584,655

(22) Filed: May 2, 2017

(65) Prior Publication Data

US 2018/0324057 A1 Nov. 8, 2018

(51) Int. Cl.
*H04L 12/24* (2006.01)
*H04L 12/26* (2006.01)

(52) U.S. Cl.
CPC ...... *H04L 41/5016* (2013.01); *H04L 41/5009* (2013.01); *H04L 43/045* (2013.01); *H04L 41/142* (2013.01); *H04L 43/062* (2013.01); *H04L 43/0882* (2013.01); *H04L 43/0894* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0138425 A1* | 5/2013 | Luke | ............... | G06F 17/2705 704/9 |
| 2016/0099844 A1* | 4/2016 | Colgrove | ............ | G06F 3/0484 715/736 |
| 2017/0078922 A1* | 3/2017 | Raleigh | ............. | H04W 28/10 |

* cited by examiner

*Primary Examiner* — El Hadji M Sall
(74) *Attorney, Agent, or Firm* — Locke Lord LLP; Scott D. Wofsy; Christopher J. Capelli

(57) ABSTRACT

An Adaptive Service Intelligence (ASI) data set related to a monitored service is received from a plurality of interfaces. A service relationship model associated with a monitored service is determined. The service relationship model includes one or more service members. Performance of each of the service members is analyzed using the received ASI data set. Performance metrics are identified for each of the service members. The identified performance metrics are indicative of corresponding service member's performance. A graphical user interface displaying a graphical representation of the identified performance metrics is generated based on the analysis. The graphical representation provides an aggregated view indicative of performance of the service members.

20 Claims, 11 Drawing Sheets

FIG. 5

Summary by Service Members

| Application | ME/Network Domain | Unique Servers | Client Communities | Transaction Rate (ps) |
|---|---|---|---|---|
| HTTP | Google SJC Farm 1 | 13 | 4 | 45,000 |
| HTTP | Google SJC Farm 2 | 14 | 4 | 38,000 |
| DNS | Google West Coast Intra | 3 | 10 | 100,000 |
| MySQL | Google West Coast Intra | 5 | 15 | 100,000 |

| Failure (%) | Timeout (%) | Retrans (%) | Avg App RT (msec) | Avg TCP RTT | Active Sessions (ps) |
|---|---|---|---|---|---|
| 5 | 11 | 5 | 5 | 1 | 30,000 |
| 11 | 12 | 11 | 6 | 2 | 29,000 |
| 15 | 14 | 15 | 7 | 3 | 100,000 |
| 10 | 2 | 10 | 8 | 4 | 100,000 |

SERVICE SUMMARY VIEW

FIELD OF THE INVENTION

This specification is directed, in general, to networking services, and, more particularly, to performing service analytics.

BACKGROUND OF THE INVENTION

Communication networks have become commonplace in the modern business world—private internal servers to enterprise architectures that support cloud based solutions. Increasingly, these communication networks are becoming more complex as modern business continues to shift various services into the digital world (e.g., Voice-over-IP) while also demanding the same (or even better) overall performance.

Typically, in an effort to improve performance of network application services, certain metrics, such as network performance events, are continuously monitored by, for example, network infrastructure (e.g., servers, routers, switches, etc.) and/or independent network monitoring devices. However, due to an ever increasing network complexity, some performance issues can prove difficult to detect, identify and troubleshoot. For example, certain network events can be self-corrected by network nodes (e.g., data is re-routed) before a network operator is made aware of an underlying issue. Other network events may simply prove too difficult to parse due to the amount of collected data.

Accordingly, there remains a need for improved network service monitoring and particularly, for improved visualization techniques that efficiently identify and display network service analytics data to a user (e.g., a system administrator, a network operator, and the like).

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, an Adaptive Service Intelligence (ASI) data set related to a monitored service is received from a plurality of interfaces. A service relationship model associated with a monitored service is determined. The service relationship model includes one or more service members. Performance of each of the service members is analyzed using the received ASI data set. Performance metrics are identified for each of the service members. The identified performance metrics are indicative of corresponding service member's performance. A graphical user interface displaying a graphical representation of the identified performance metrics is generated based on the analysis. The graphical representation provides an aggregated view indicative of performance of the service members.

BRIEF DESCRIPTION OF THE DRAWINGS

The accompanying appendices and/or drawings illustrate various, non-limiting, examples, inventive aspects in accordance with the present disclosure:

FIG. 5 is an interactive graphical representation of an aggregated service summary view for all service members, according to an embodiment of the present invention;

DETAILED DESCRIPTION OF CERTAIN EMBODIMENTS

Figure 1A:
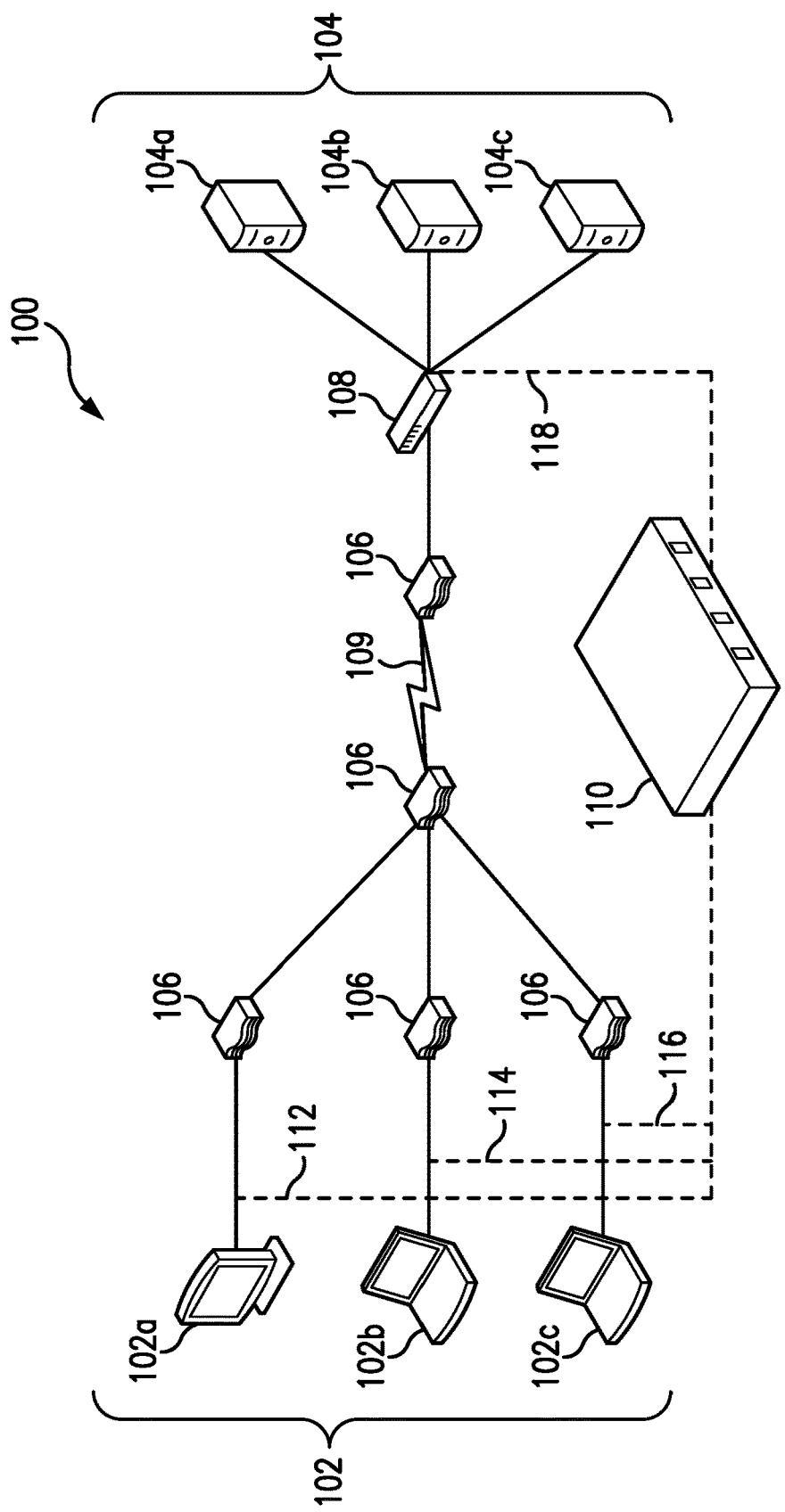
FIGS. 1A and 1B illustrate the architecture of a system for monitoring a service in a communications network, according to one embodiment of the present invention.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. In addition, the present invention is not described with reference to any particular programming language. It will be appreciated that a variety of programming languages may be used to implement the embodiments of the present invention as described herein, and any references below to specific languages are provided for disclosure of enablement of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

In a communication network, traffic or data flows between nodes or network devices along one or more data paths (e.g., from a source node to a destination node including nodes there-between). As discussed above, isolating traffic or network data relating to network service performance issues for a conventional data path is difficult at best due to an inherent underlying network complexity (e.g., numerous paths, numerous nodes, numerous service enablers etc.). Embodiments of the present invention provide improved techniques for network monitoring to facilitate quicker and more accurate network service triaging. For example, these improved network monitoring techniques provide improved visual representations of a service relationships model associated with a monitored service. Importantly, such visual representations, as discussed in greater detail below, include performance indicators for each service member which may be influencing the service performance. To monitor service performance in a communication network a plurality of devices dedicated to monitoring data transmitted over the communication network are configured to monitor various metrics, such as certain Key Performance Indicators (KPIs), and provide data indicative of patterns of important metrics over time. The plurality of devices summarizes a plurality of observed data packets into a compact Adaptive Session Intelligence (ASI) data set for storage and processing. The ASI data set provides the analysis granularity required to extract rich network, service- and user-related metrics on devices, subscribers, base station ID, Location Area (LA), Routing Area (RA), QoS, SITE, Access Point Name (APN), Tracking Area Code (TAC), and VLAN. Each record in the ASI data set may be updated in real-time. Depending on protocols, a network monitoring system extracts different sets of information, removes redundant information from the plurality of data packets, and focuses on the various types of performance problems affecting end users of numerous network applications.

Embodiments of the present disclosure give users freedom to decide which service members to monitor for a service and which measure group to use for a particular context. In some embodiments, one or more measure groups can be created for a service. Each measure group can be defined by a search query that produces a plurality of metrics values derived from the acquired data set. Each value can be indicative of how a particular aspect of the service is performing at a point in time or during a period of time with respect to a particular service member. Embodiments of the present disclosure enable users to decide what values indicative of individual service member performance should be analyzed and if they need more detailed information. For example, a user may wish to expand dimensions of monitored service members, such as, but not limited to, servers, client communities and locations. As another example, one or more users may wish to expand metrics (look at more KPIs) or may want to analyze patterns of important KPIs overtime.

Advantageously, making the best use of information is left to the user. For example, the user can change the display setting so that only one or two contexts of service related information are displayed. In other words, the provided data becomes only as good as the user using it. Hence, various embodiments of the present invention provide a network monitoring system that can facilitate more efficient, uniform and effective analysis and troubleshooting of various service related events by providing the overall actionable visual information that is measure centric and specialized in nature and that addresses the above challenges.

Overview of System Architecture Turning now descriptively to the drawings, in which similar reference characters denote similar elements throughout the several views, FIG. 1A depicts an exemplary communication network 100 in which bellow illustrated embodiments may be implemented.

It is to be understood a communication network 100 is a geographically distributed collection of nodes interconnected by communication links or interfaces and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, or Powerline Communications (PLC), and others.

The exemplary communication network 100 of FIG. 1 illustratively comprises client communities 102 (e.g., client computing devices 102a-102c) and a server farm 104 (e.g., servers 104a-104c) interconnected by various methods of communication (e.g., routers 106, switches 108 and the like). For instance, link 109 may be a wired link or may comprise a wireless communication medium, where certain nodes are in communication with other nodes, e.g., based on distance, signal strength, current operational status, location, etc. Moreover, each of the devices can communicate data packets (or frames) with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

The term "community" as used herein refers to a dynamic and virtual association of client computing devices 102a-102c. The client community 102 can comprise as little as a few client computing devices or as many as thousands of client computing devices or more.

The client-server model of computer process interaction is widely known and used. According to the client-server model, a client process sends a message including a request to a server process, and the server process responds by providing a service. As used herein in the context of a client-server relationship, the term "server" refers generally to a computing device that provides information and/or services to other devices over a communication link (e.g., a network connection), and is not limited to any particular device configuration. Servers may include one or more suitable devices, such as dedicated server computing devices, or virtualized computing instances or application objects executing on a computing device. The term "client" can be used to refer to a computing device (e.g., a client device) that obtains information and/or accesses services provided by a server over a communication link, and is not limited to any particular device configuration. However, the designation of a particular device as a client device does not necessarily imply or require the presence of a server. At various times, a single device may act as a server, a client, a server and a client, or neither, depending on context and configuration. Actual physical locations of clients and servers are not necessarily important, but the locations can be described as "local" for a client and "remote" for a server to illustrate a common usage scenario in which a client is receiving information provided by a server at a remote location. A well-known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages. In the illustrated embodiment, the server farm 104 includes a web application server (sometimes called a web server below) 104a, a database server 104b and a domain name service (DNS) server 104c. It should be noted that the web server 104a includes an HTTP server as a front end.

In one embodiment, the server computing devices 104a-104c are connected to a local area network (LAN) and a wide area network (WAN), such as the Internet. In such an embodiment, a web application may be hosted by the web server 104a. A user of a client computing device (e.g., second client computing device 102b) who has a subscription to the web application (i.e., has access to the web application's functionality by paying, for example, a monthly fee) accesses the web application by connecting to the web server 104a hosting the web application with a web browser executing on the client computing device 102b. A web application manager may be used to manage the status of subscriber accounts and open new subscriber accounts, and by itself may be a web application.

In use, a web browser connects to the web server 104a and downloads the web application's interface and data associated with the web application to the client computing device 102b. In some cases, some of the functionality of the web application may also be downloaded to the client computing device 102b for local execution to increase the speed of the application by allowing some processing to be done locally rather than remotely.

The user may then, using the web browser, enter information into the interface or manipulate information using the interface, at which point the information may be transmitted back to the web server 104a for processing. The web server 104a hosting the web application may then transmit the processed data back to the client computing device 102b for further use by the user, or may store the processed data in a computer-readable medium (e.g., a database server 104b) for subsequent access by the user via the web application.

The database server 104b is not particularly limited and may comprise any database server that is suitable to carry out the embodiment. The database server 104b may be, for example, a Windows OS, MS SQL Server. The database server 104b may comprise a back-end system communicating with a database application using client/server architecture. The back-end system performs tasks such as data analysis, storage, data manipulation, archiving, and other non-user specific tasks.

In computer networking, DNS is a name resolution protocol for transmission control protocol (TCP)/IP networks, such as the Internet. Typically, a DNS server located in a data path resolves a DNS query, received from a client device (e.g., a host computing system 102a) in a network, by returning one or more IP addresses corresponding to a domain name associated with a remotely located computing resource, such as a remote database server 104b. In other words, a DNS server 104c translates domain names into IP addresses and keeps information about location and the IP addresses of remotely located computing resources transparent to users. Information is ordinarily transmitted within the networks in packets and the term packet refers to a unit of data communicated within a network. A packet typically includes a packet source identifier and a packet destination identifier used to navigate the packet data through a network. The term packet may refer to a unit of data through a network. The term packet may refer to a unit of data communicated at any level of an open systems interconnection (OSI) model and between levels of the OSI model.

According to an embodiment of the present invention, the communications network system 100 may further include one or more network monitors 110. The network monitors 110 are hardware, software, firmware or a combination thereof for monitoring network communication at various locations or links of the network 100. Each of the network monitors 110 may be deployed at certain locations or links of the network 100 to collect network data traversing the locations or links.

In one embodiment, the network monitor 110 monitors traffic flowing to and from the first client computing device 102a, second client computing device 102b and the third client computing device 102c via links 112, 114 and 116, respectively. Furthermore, the network monitor 110 is connected by link 118 to the server farm 104 interface. Network monitoring is an important operational scheme for network operators.

After collecting the network data packets, the network monitors 110 generate ASI data sets based on the received rich packet-flow data, and store the ASI data. The network monitor 110 may be a special purpose computing device or a software component (not limited to a single process) dedicated to monitoring data communicated via the network 100. Alternatively, the network monitor 110 may be a general purpose computing device with specialized software components installed thereon. In one embodiment, the network monitor 110 is embodied as nGenius Collectors, nGenius Probes or nGenius InfiniStream, available from NetScout Systems, Inc. of Westford, Mass.

Figure 1B:
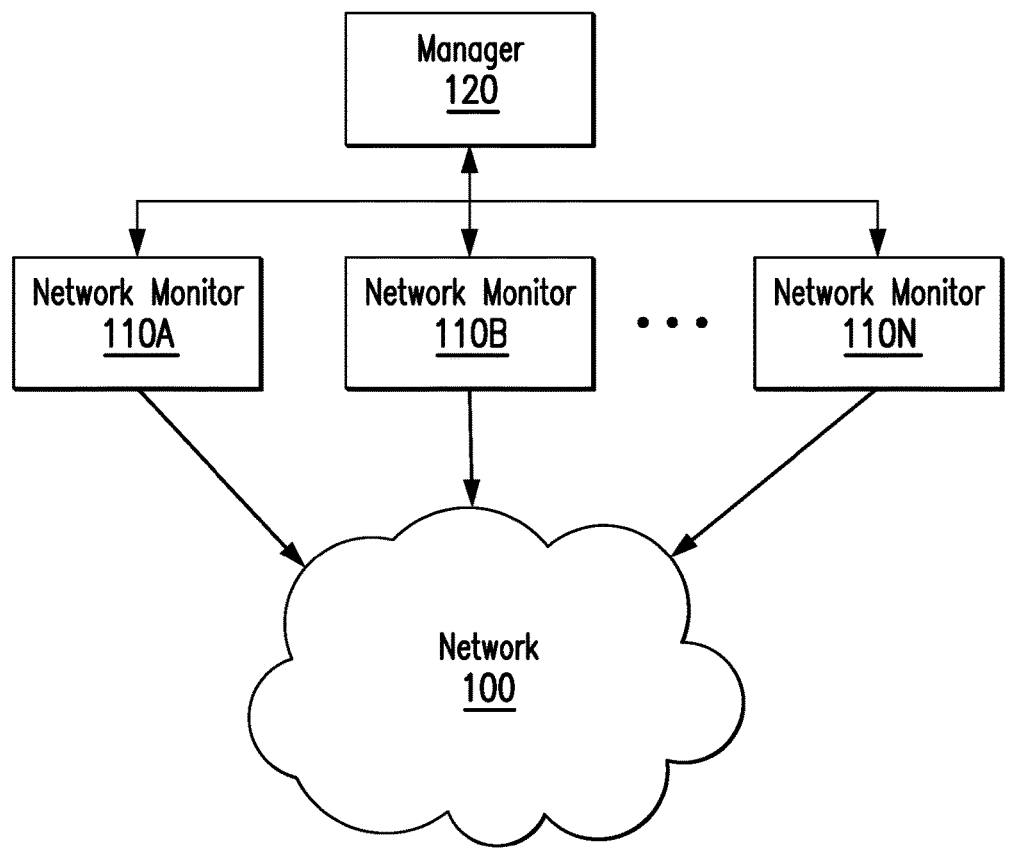

Referring now to FIG. 1B, the network monitoring system may further include a manager 120 connected to one or more network monitors 110A through 110N (hereinafter collectively referred to as "the network monitors 110"). The network monitors 110 are connected to the network 100 to monitor network data packets traversing at certain locations or links of the network 100 as described above in conjunction with FIG. 1A. The locations or the links connected to the network monitors 110 are preferably critical or important locations of the network 100.

The manager 120 is connected to the network monitors 110 to set various operating parameters. Although the manager 120 is illustrated as being directly connected to the network monitors 110, the manager 120 may communicate with the network monitors 110 via the network 100 or other networks. The network monitors 110 may be located remotely from the manager 120. Alternatively, the manager 120 may be co-located with one of the network monitors 110.

The operating parameters set by the manager 102 may include, among others, information stored in ASI records, the format of the ASI records, and lengths of time the ASI record should be stored. The information stored in the ASI may be set per protocol-by-protocol basis.

The manager 120 is hardware, software, firmware or a combination thereof for managing the operation of the network monitors 110. The manager 120 may perform one or more of the following functions: (i) process information based on ASI or selected network data packets received from the network monitors 110, (ii) receive parameters from a user for setting the operation of the network monitors 110, (iii) send commands to the network monitors 110 to set parameters or preferences for their operations, (iv) present the collected information to the user, (v) determine service relationship model associated with a monitored service, (vi) analyze performance of each of the service members using the received ASI data set, and (vii) provide actionable information about the monitored service.

The manager 120 may be embodied as a general purpose computing device installed with specialized software for performing one or more of these operations. Alternatively, the manger 120 is embodied as a specialized computing device. In one embodiment, the manager 120 is a computing device running nGenius ONE, available from NetScout Systems, Inc. of Westford, Mass. According to an embodiment of the present disclosure, the manager 120 may include a user interface (not shown in FIG. 1B) that enables a user to interact with the network monitoring devices 110, to operate the network monitoring devices 110, and to obtain data therefrom, whether at the location of installation or remotely. Alternatively, at least one of the client computing devices 102a-102c (shown in FIG. 1A) may include the user interface communicatively coupled to the manager 120.

Example Architecture of Manager

Figure 2:
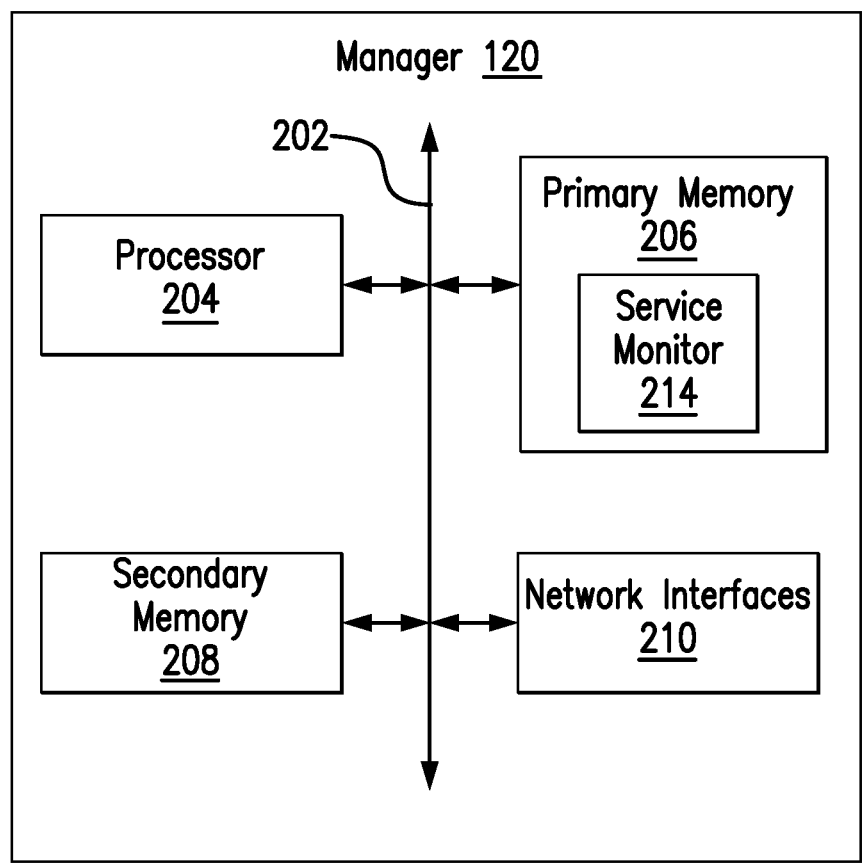
FIG. 2 is a block diagram of the manager of FIG. 1B, according to one embodiment of the present invention.

FIG. 2 is a block diagram of the manager 120, according to one embodiment of the present invention. The manager 120 may include, among other components, a processor 204, primary memory 206, secondary memory 208, and one or more network interface(s) 210. These components are connected and communicate via a bus 202. The manager 120 may also include other components not illustrated in FIG. 2, such as user input devices (e.g., keyboard and mouse) and display devices (e.g., a display driver card).

The processor 204 executes computer instructions stored in the primary memory 206 and/or the secondary memory 208. Although only a single processor is illustrated in FIG. 2, two or more processors may be used to increase the computing capacity and the processing speed of the manager 120.

The primary memory 206 is a computer readable storage medium that stores, among other data, computer instruction modules for processing, storing and retrieving network traffic data. The primary memory 206 may be implemented in various data storage devices (e.g., Random-Access Memory (RAM)) having a faster access speed compared to the secondary memory 208. The faster access speed of the primary memory 206 allows the manager 120 to analyze ASI data sets in real time.

The secondary memory 208 may be a secondary storage device for storing, among others, the processed ASI data sets. The secondary memory 208 may be embodied, for example, as a solid-state drive, hard disk or other memory devices capable of storing a large amount of data compared to the primary memory 206.

The network interfaces 210 may include a NIC (network interface card) or other standard network interfaces to receive ASI data sets. For example, the network interfaces 210 may be an Ethernet interface, a WiFi (IEEE 802.11) interface or other types of wired or wireless network interfaces. In one embodiment, two or more network interfaces are used to communicate with different types of networks or perform specialized functions.

In one embodiment, the network interface 210 sends the ASI data sets directly to a service monitor 214. The network interface 210 may send one data set of ASI data to the service monitor 214 for processing the real-time ASI data and another ASI data set for storing in the secondary memory 208 as historical data. Alternatively, the service monitor 214 may monitor service performance based on historical data stored by the secondary memory 208. That is, the service monitor 214 receives the ASI data sets from the network interface 210 (if analysis is done in real-time) or from the secondary memory 208 (if analysis is based on historical information), determines a service relationship model associated with a monitored service, analyzes performance of each of the service members using the acquired ASI data set, identifies performance metrics indicative of service members' performance, generates a graphical representation of the identified performance metrics based on the analysis and sends the ASI data set values related to service performance degradation to the secondary memory 208. By receiving the ASI data directly from the network interface 210, the service monitor 214 operating in real time mode can process the ASI data at a high speed without delays associated with accessing the secondary memory 208.

Figure 3:
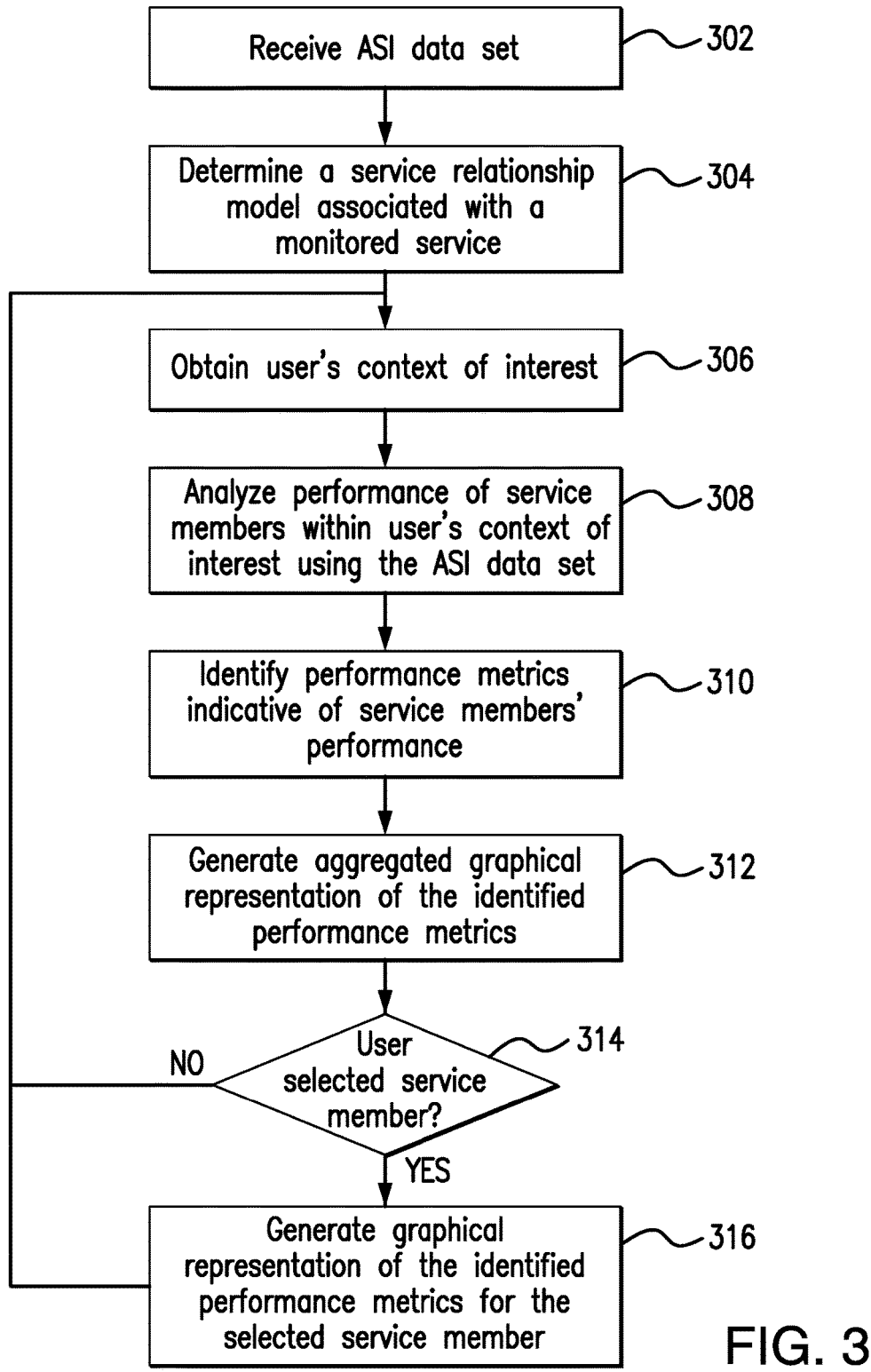
FIG. 3 is a flowchart illustrating a method for reporting service performance statistics in a communication network, in accordance with illustrative embodiments of the present invention.

FIG. 3 is a flowchart illustrating a method for reporting service performance statistics in a communication network, in accordance with illustrative embodiments of the present invention. Before turning to description of FIG. 3, it is noted that the flow diagrams shown therein is described, by way of example, with reference to components shown in FIGS. 1 and 2, although these operational steps may be carried out in any system and are not limited to the scenario shown in the aforementioned figures. Additionally, the flow diagram in FIG. 3 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

At step 302, the service monitor 214 receives ASI data from the network interface 210 or from the secondary memory 208. It should be noted that more than one network interface 210 can be used to receive ASI data. As noted above, the ASI data set provides performance metadata with analysis granularity required to extract rich network, service-related metrics on devices, subscribers, base station ID, VLAN, etc. A received data set may be labeled with a time period. In one embodiment, the received data set may correspond to a one hour time period. The ASI data set may include, among others, metrics of various types related to various services. Such metric ASI data may be sampled by the service monitor 214 at certain time intervals. These samples may be taken, for example, at five twelve minute intervals. Each data set may contain information about some metric, e.g. total number of requests or percentage of timeouts, at the sample time that the data set is captured.

According to some embodiments of the present invention, at step 304, the service monitor 214 may establish a service relationship model associated with a monitored service. For example, some or all of the service members for the monitored service may be observed over a first period of time to detect which service members are interrelated to one another based on utilization or behavior patterns of the service members with respect to one or more performance metrics. For example, based on global observation of the relative performances of all service members, the service monitor 214 can help identify one or more subsets of service members that are interdependent or behaviorally related to one another. Based on this observed behavior, the service monitor 214 helps to create one or more service member groups from the plurality of service members and each service group may be monitored for anomalies. Thus, each service member group may be made up of a subset of the service members that have been determined to have performance that is interrelated or codependent, at least in part, on performance of the other service members in that group. As one example, when one of the service members in a particular service member group experiences an increase in traffic or an increase in latency, the other service members in the group might also be expected to experience a similar increase in traffic or latency. In addition, the service relationship model generated at step 304 may be a statistical model that predicts how each service member of a particular service group will behave in response to performance of other members of the particular service group based on the observed performance patterns.

Figure 4:
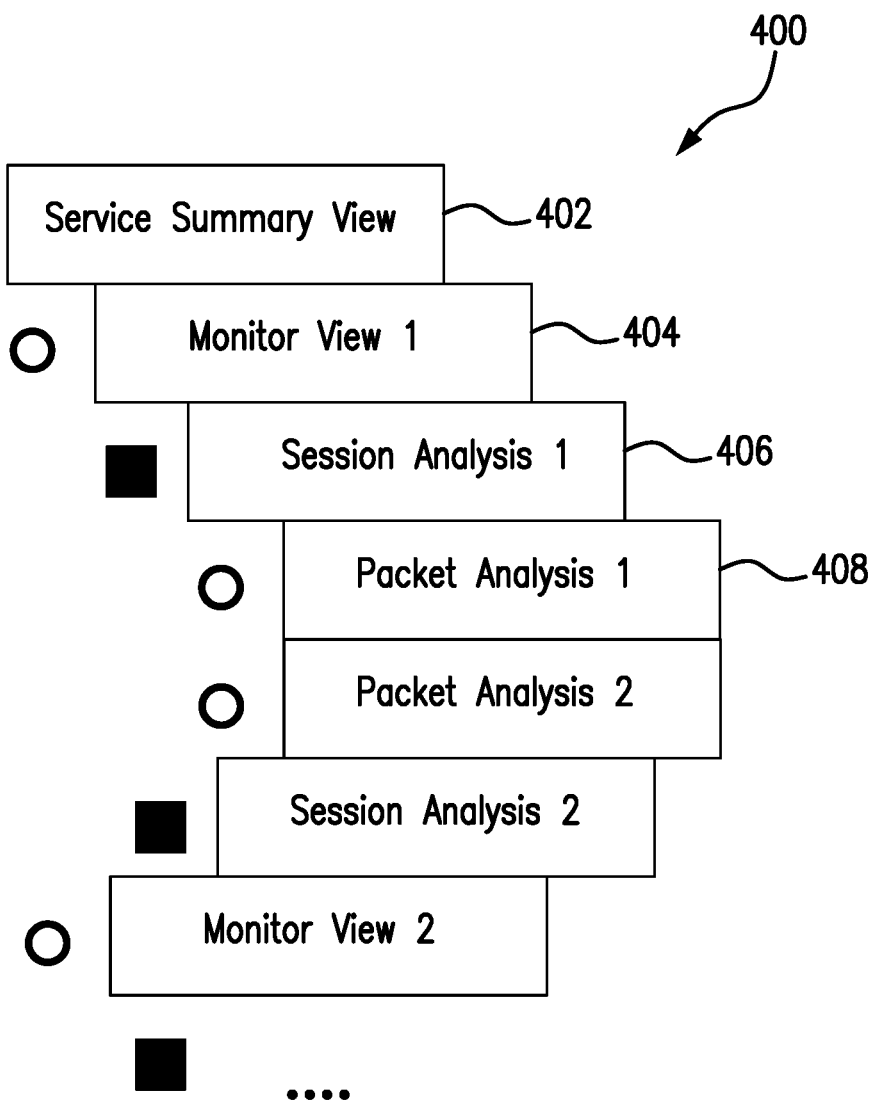
FIG. 4 illustrates one embodiment of a hierarchical navigational tree.

According to an embodiment of the present invention, at step 306, the service monitor 214 enables users to select monitoring context of interest, for example, by presenting a hierarchical navigation tree via a Graphical User Interface (GUI). Context is data about the environment in which a given service is provided, characteristics of a given service, qualities of a given service, or some combination of these. FIG. 4 illustrates one embodiment of the hierarchical navigational tree 400. In this illustrative embodiment, the navigation tree provided by the service monitor 214 provides the user with an access to a set of highly interactive data visualization tools with which the user can explore sets of data related to the monitored service. Data visualization tools provided by the navigational tree 400 can include, for example, a service summary view 402; a service monitor view 404; a session analysis view 406; and a packet analysis view 408. The service summary view context 402 may comprise a high level 'white board' summary view of all service members associated with the monitored service. This summary view 402 provides visibility into each service member and presents summarization/aggregation of critical user-defined metrics per service member.

Referring back to FIG. 3, according to an embodiment of the present invention, next, at step 308, the service monitor 214 analyzes performance of the monitored service based on the selected context of interest using the acquired ASI data set. For instance, if the user selected the session analysis context 406, the service monitor 214 may evaluate various communication sessions associated with the monitored service. As another non-limiting example, if the user selected the packet analysis context 408, the service monitor 214 may help analyze and verify a relevant subset of all captured packets transmitted across the links 112-118. In one embodiment, in step 308, the service monitor 214 may monitor the performance of the server or distributed servers providing the monitored service to identify one or more performance issues based on current or past performance, functionality, content, or business relevancy. In addition, in step 308, the service monitor 214 may evaluate how the service delivery is faring for the client communities of users accessing the monitored service. In some embodiments, this step may further involve determining if there are any interdependencies between various KPIs included in the ASI data set.

According to an embodiment of the present invention, at step 310, the service monitor 214 may identify and aggregate a plurality of sets of performance metrics (KPIs) indicative of service members' performance. In this embodiment, the service monitor 214 may aggregate the KPIs into three groups, such as, server load, latency and failures. It should be noted that latency and load balancing are typically two main challenges for deploying and providing new and existing services. The server load group may include metrics that would help users to determine if servers associated with the monitored service are being effectively used/load balanced and if any of them are overloaded due to load skew. When overloading due to load skew is detected, the service monitor 214 may include these metrics in the graphical representation generated at step(s) 312 and/or 316 to alert the users. In this situation users may want to migrate service containers from the overloaded servers to another server having spare capacity. The latency group may include various monitoring thresholds which may be based on, for example, response times of the servers or any other suitable latency monitoring metric. In this manner, if a service provided to a particular client computing device 102 is migrated from a first server to a second server that has different performance characteristics than the first server, a monitoring threshold for the second server may be determined by the service monitor 214 based on both: (i) a previous monitoring threshold for the first server, and (ii) a comparison of the performance characteristics between the first server and the second server. The failures group may include metrics that would help users to determine a trend in the failure metrics (e.g., if most of the failures are coming from a select few servers or whether the most of the occurring failures are of a particular type). Furthermore, the identified performance metrics should reflect the KPIs as applicable to a particular service being monitored by the service monitor 214. For example, if the monitored service comprises a media service, the service monitor 214 should focus on active streams, a MOS (Mean Opinion Score) value and the like instead of success/failure rates.

At step 312, the service monitor 214 may generate actionable graphical view containing ASI data set values indicative of service performance degradation based on the analysis performed in steps 304-310. FIG. 5 is an interactive graphical representation of an aggregated service summary view 500 for all service members, according to an embodiment of the present invention. In this illustrative embodiment, the generated view may include the following information: applications 502 associated with the monitored service, network domains 504 traversed by the monitored service, unique servers 506 providing the monitored service, client communities 508 receiving at least some part of the monitored service, transaction rate information 510 associated with the monitored service, information on a response failure 512, timeout 514 and retransmission 516 percentages that have taken place, information on an average application 518 and TCP 520 delay times, as well as active sessions metrics 524 associated with the monitored service. The service summary view 500 may be presented by the service monitor 214 in response to user selecting the service summary view context 402 via the hierarchical navigational tree 400 (shown in FIG. 4). As noted above, this summary view 500 provides visibility into each service member and presents summarization/aggregation of critical user-defined metrics per service member. In this case, the presented service members group includes HTTP applications 526 and 528 serviced by two different server farms, DNS application 530 and database client application 532 (e.g., MySQL application). The interactive view 500 enables users to get more detailed analysis by selecting one of the rows 526-532 to indicate a service member of interest. In other words, at step 312, the service monitor 214 provides access to a summary view and provides the capability to select any service member in the view to put service member into a focus state on the graphical representation.

Referring back to FIG. 3, according to an embodiment of the present invention, at step 314, the service monitor 214 determines if the user selected any of the service members 526-532 presented by the summary view 500. Selection of a service member (decision block 314, "yes" branch) automatically causes the service monitor 214 to facilitate the retrieval and presentation of the associated selected service member view (step 316). Thus, the user can interact with the service summary view 500 to move back and forth between different service member views, thereby revealing the underlying more detailed views of information of interest for improved triaging. In one embodiment, in response to determining that the user selected a particular service member, the service monitor 314 may present graphical representations representing performance of servers providing the selected monitored service member and graphical representations representing performance of all impacted/affected client devices receiving the monitored service.

Figure 6A:
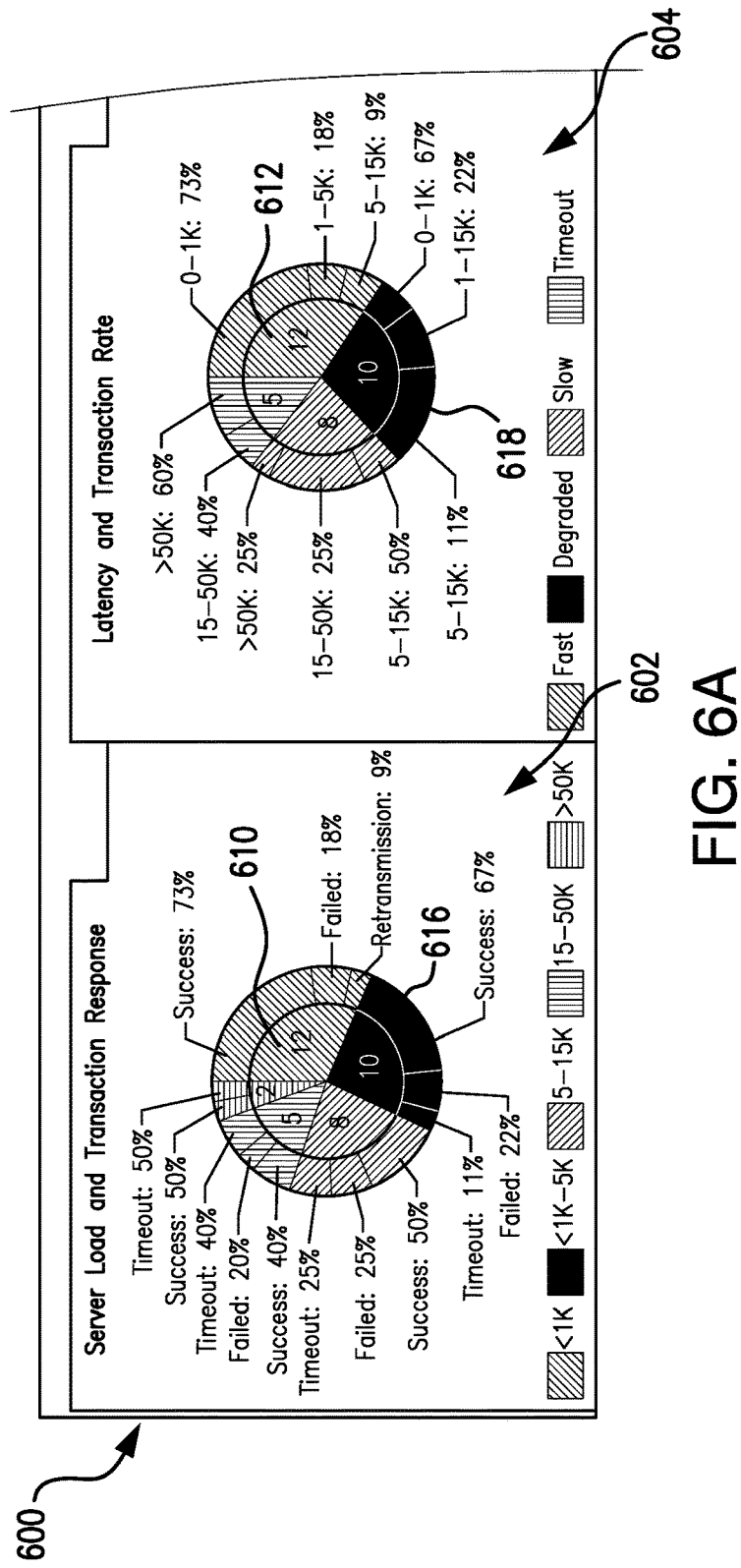
FIGS. 6A-GB illustrate a graphical representation of servers' performance for all selected service members providing the monitored service, according to an embodiment of the present invention.
Figure 6B:
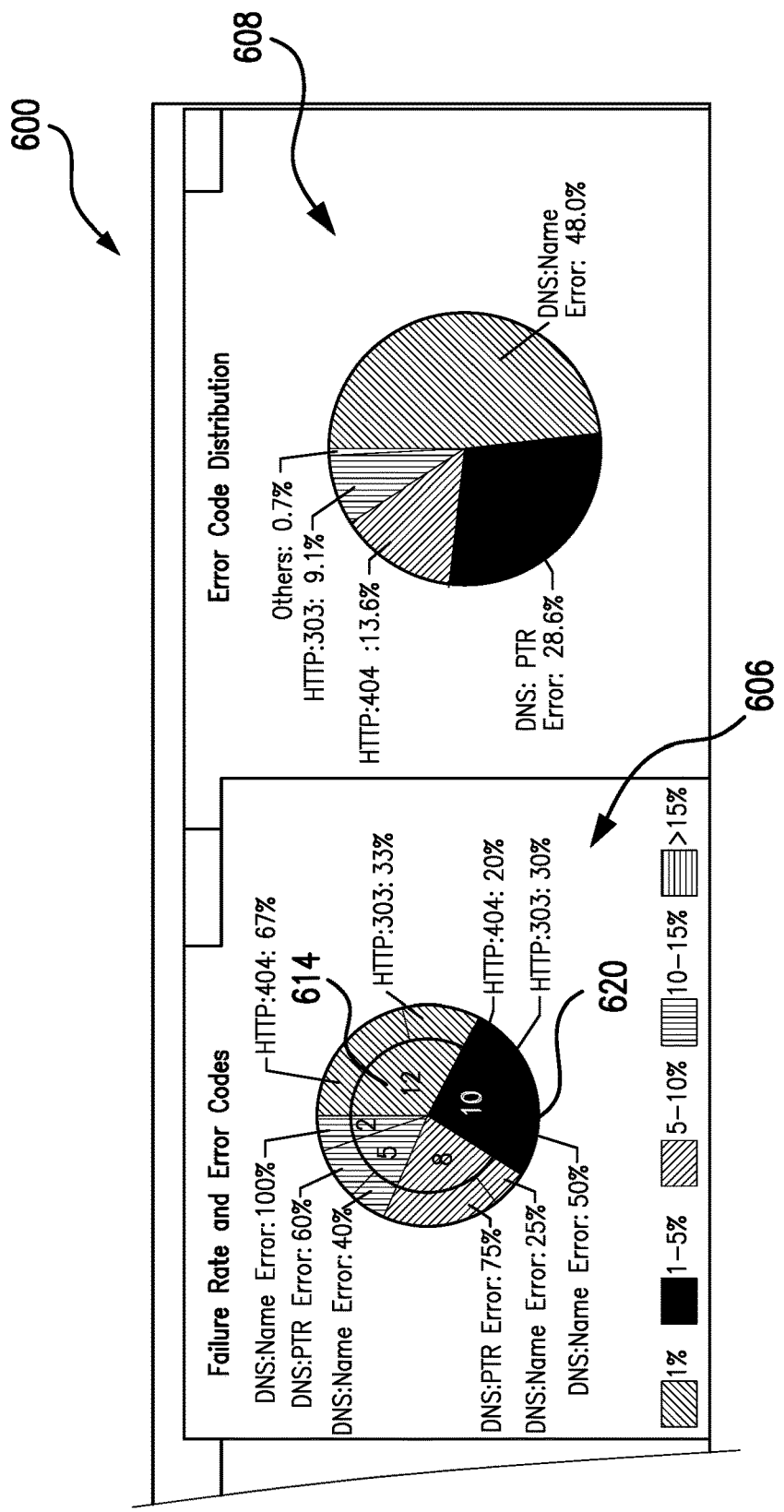

FIGS. 6A and 6B illustrate a graphical representation 600 of servers' performance for all selected service members providing the monitored service, according to an embodiment of the present invention. This graphical representation 600 shows unique server distribution against various critical service measurement groups (discussed above in conjunction with the step 310). This representation 600 helps users assess the overall health of the servers and quickly identify any area(s) of concern. In one embodiment, the graphical representation shows distributions against the server load group 602 (FIG. 6A), distribution against the latency group 604 (FIG. 6A) and distribution against the failure group 606 (FIG. 6*b*). It should be noted that these distributions 602-606 can be shown either for the selected service member of interest or as aggregated summary for all service members in the group. In addition, the graphical representation 600 may include an error code distribution 608.

In various embodiments of the present invention, the measurement distributions 602-606 may be presented as various graphical representations, such as pie charts, bar charts, etc., that are representative of the corresponding distributions. A pie chart is typically a circular chart including a plurality of sectors. In some embodiments of the present invention, the pie chart may be multi-dimensional illustrating a relationship between two or more measures. In the illustrated examples, each chart 602-606 has two measures. A two dimensional pie chart represents two circular charts (pies) combined in one, each chart including a plurality of sectors. In FIGS. 6A and 6B, server load, latency and failure rate are primary measures of charts 602-606 and are represented by inner pies 610-612 and 614, respectively. In addition, transaction response, transaction rate and error code measures are secondary measures of charts 602-606 and are represented by outer pies 616-620, respectively. The secondary measures are presented graphically for comparison against the primary measures. These graphical representations help users spot any interrelations among the primary and secondary measures. For example, in the failure rate versus error codes distribution 606, the sectors of the inner pie 614 shows server distribution for different buckets of failure rate (e.g., less than 1%, 1%-5%, 5%-10%, 10%-15% and greater than 15% buckets), while each sector of the outer pie 620 represents a distinct type of observed failures. Such visual comparison of measures represented by the inner pie 614 and outer pie 620 enable users to quickly determine if any particular error code was the dominant one when higher failure rates were observed by the service monitor 214. In addition, error code distribution can be shown as a separate chart 608 in FIG. 6B.

In at least one embodiment, the interactive graphical representation 600 enables users to select any sector of inner pie charts 610-614 to be used as a filter context for further analysis. It should be further noted that secondary measures of each chart (transaction response, transaction rate and error code measures) can be changed dynamically by users to allow multiple comparisons versus the primary measures of the corresponding chart.

Figure 7A:
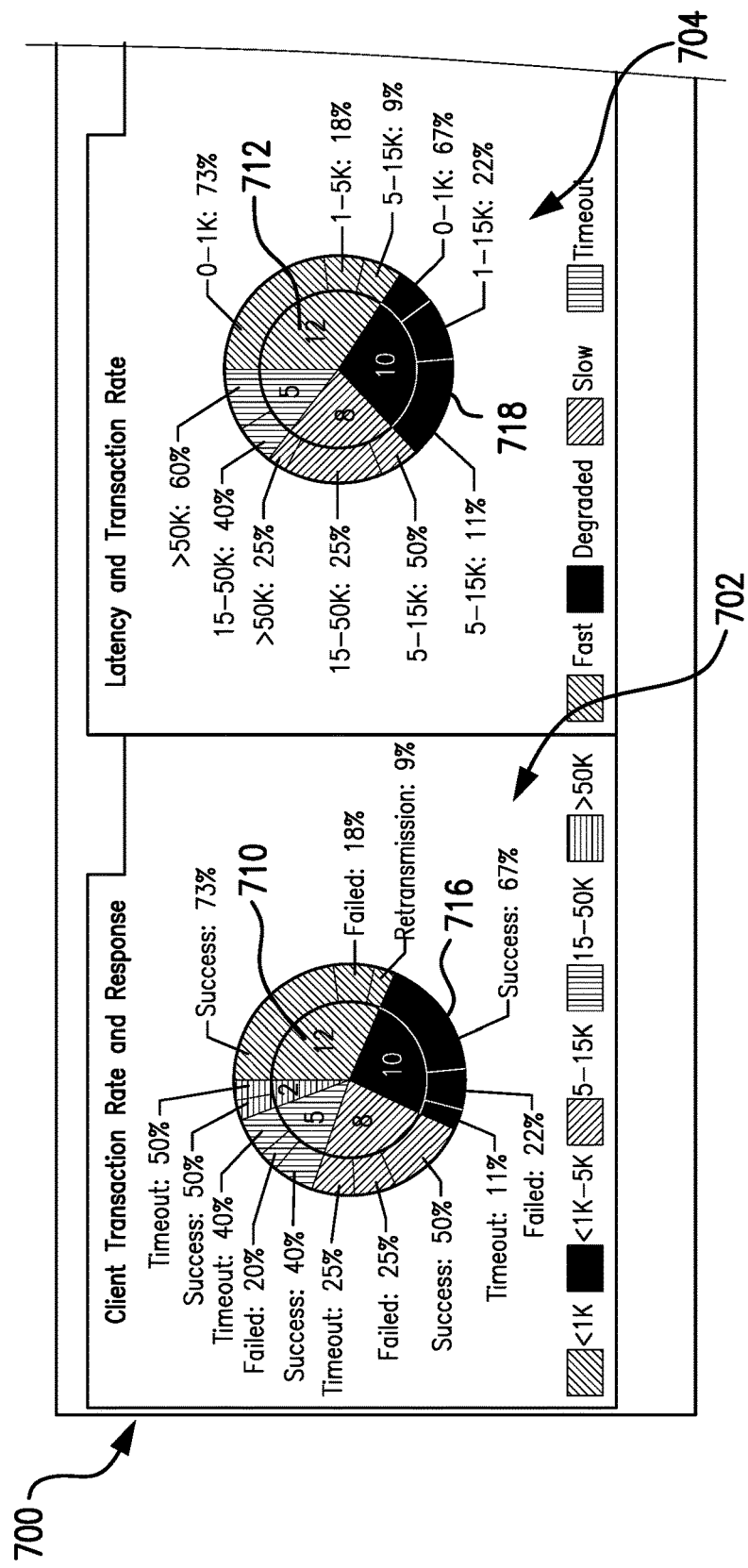
FIGS. 7A-7B illustrate a graphical representation of performance of all impacted/affected clients receiving the monitored service, according to an embodiment of the present invention.
Figure 7B:
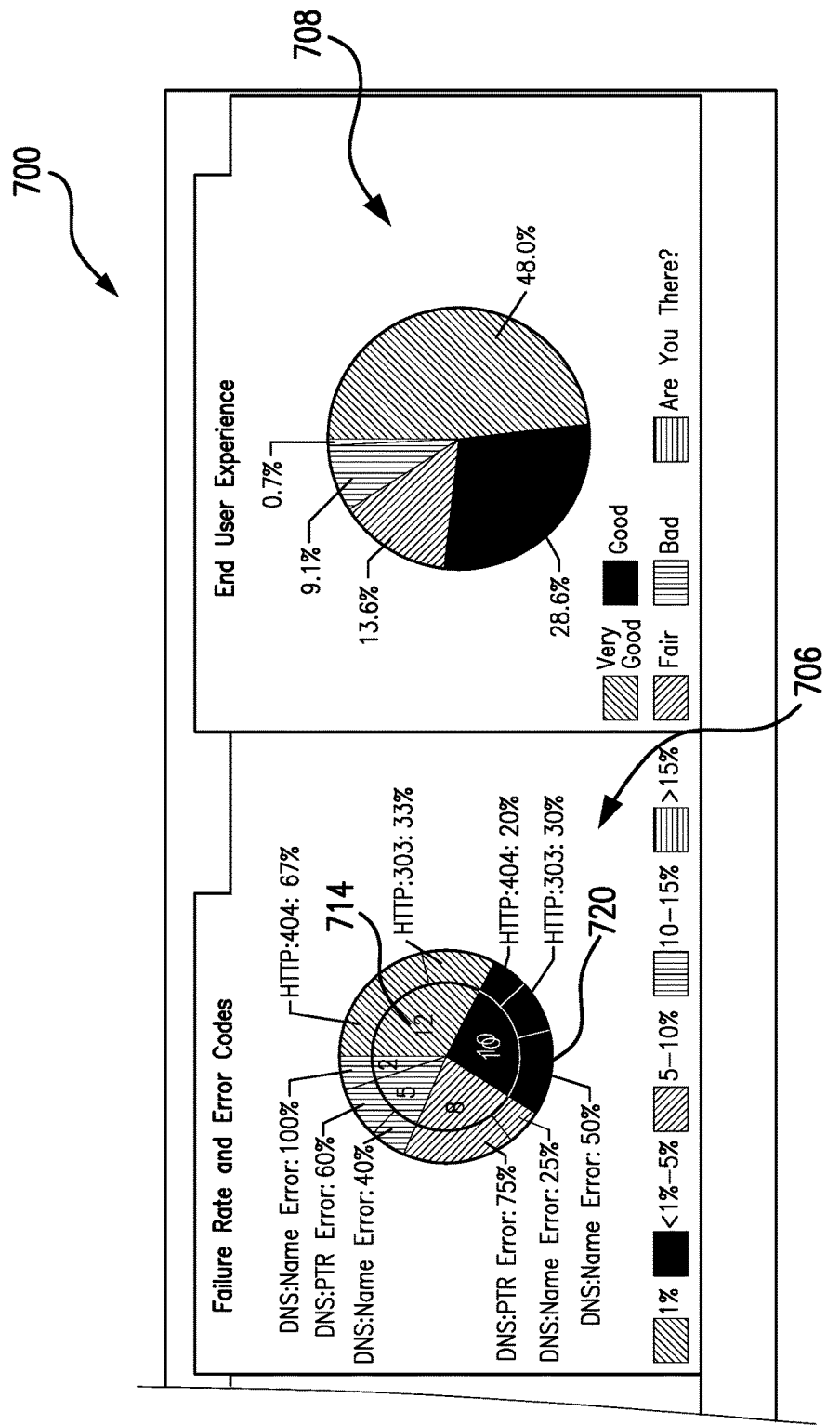

FIGS. 7A and 7B illustrate a graphical representation 700 of performance of all impacted/affected clients receiving the monitored service, according to an embodiment of the present invention. The graphical representation 700 also shows distributions against the server load group 702 (FIG. 7A), distribution against the latency group 704 (FIG. 7A) and distribution against the failure group 706 (FIG. 7B). These distributions are also represented as two dimensional charts in which the inner pies 710-714 represent client transaction rate, latency and failure rate, while the outer pies represent 716-720 represent client response, client transaction rate and error codes, respectively. Pie charts 702-706 also enable users to obtain quick comparison between the primary and secondary measures of the affected client community distributions. In addition, the graphical representation 700 includes a pie chart 708 representing quality of the end user experience.

Figure 8:
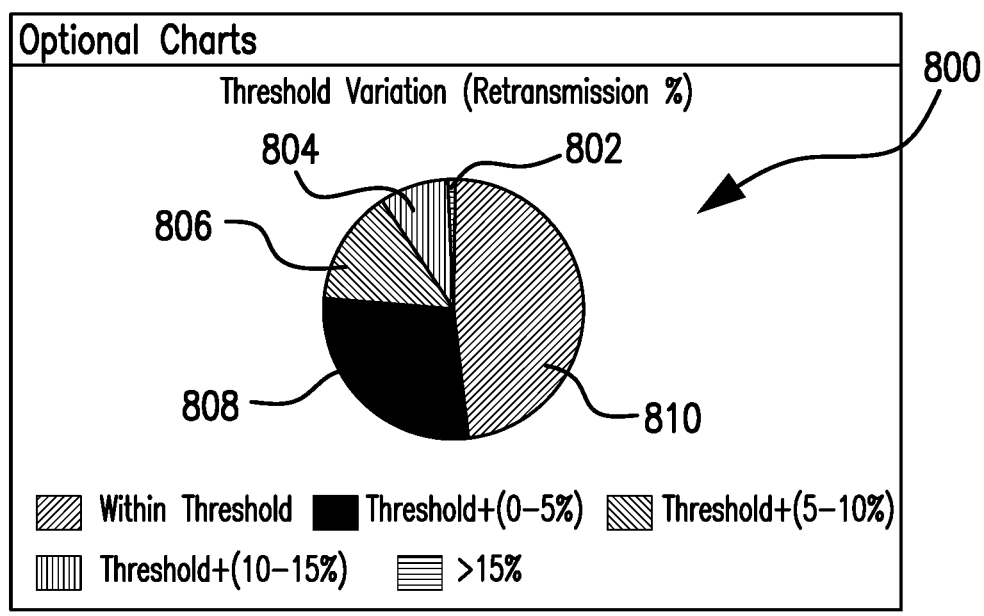
FIG. 8 is an exemplary optional chart presented to a user, according to an embodiment of the present invention.

Moreover, in some embodiments, at steps 312-316, the service monitor 214 may enable users to generate a hierarchy of optional pie charts. By using the hierarchy of optional pie charts, each user can choose to define higher analysis at any level of detail. FIG. 8 is an exemplary optional chart presented to a user, according to an embodiment of the present invention. The pie chart 800 shown in FIG. 8 is a chart representing percentage of retransmissions as compared to a particular threshold. The pie chart 800 shows threshold variations that are broken down into multiple levels 802-810. In one embodiment, the user may define thresholds in alert profile of the monitored service. Such alert profiles may allow the user to self-determine what data conditions require a particular alert. The user may even define different message formats for different recipients. At least in some embodiments, the lower level thresholds (e.g., warnings) may be chosen by the service monitor 214 by default. However, the alert profiles allow users to change threshold significance levels from lower level to critical, if necessary. According to an embodiment of the present invention, the service monitor 214 may also enable users to choose other measures as supported in threshold definition of alert configuration.

Although server load, latency and failure rate have been described along with particular examples above, primary measures analyzed in steps 308 and 310 are not limited to the particular examples, nor to the categories of a user selected service context. Service context analysis includes any action taken in response to an occurrence of a data event that characterizes a given service or is indicative of a quality of a given service. Furthermore, any service analysis of a particular service member or service analysis of all service members of a particular service relationship model performed within user's context of interest (step 308) can be performed substantially simultaneously as other data analyses to draw various analytical conclusions related to the monitored service's performance. According to various embodiments of the present invention, the manager 120 is a modular application such that it can easily be repurposed or modified to solve new use cases for new types of monitored services.

Advantageously, the various embodiments described herein provide an analytical view which facilitates more efficient service monitoring and more accurate triaging of identified service issues. Certain discrete monitoring metrics are used to analyze monitored service's performance within user selected context of interest. One or more measure groups can be created for a service. Non-limiting examples of such groups may include aggregated KPIs related to server load, latency and various failures associated with the monitored service. In the aforementioned embodiments, to enable efficient and uniform monitoring and troubleshooting of various factors affecting service performance, one or more of monitoring devices monitor a subset of KPIs and generate the ASI dataset, which is sent to the manager from each monitoring device. The manager, in turn, generates actionable (interactive) graphical representation(s) based on the analyzed ASI information. Furthermore, the presented graphical representations enable users to acquire sufficient information by drilling down to individual service members or by comparing individual measures (e.g., comparing primary measures to secondary measures) for the selected monitored service(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reporting service performance statistics in a network, the method comprising steps of:

receiving an Adaptive Service Intelligence (ASI) data set related to a monitored service from a plurality of interfaces;

determining a service relationship model associated with a monitored service, the service relationship model comprising one or more service members wherein at least two of the service members are observed for a predefined time period to identify interrelated service members based upon behavior patterns of the observed service members with respect to one or more performance metrics;

analyzing performance of each of the one or more service members using the received ASI data set;

identifying one or more performance metrics for each of the one or more service members, wherein the identified performance metrics are indicative of corresponding service member's performance; and generating a graphical user interface displaying a graphical representation of the identified performance metrics based on the analysis, the graphical representation providing an aggregated view indicative of performance of the one or more service members.

2. The method of claim 1, wherein the steps of analyzing performance of the service members and generating the graphical user interface are performed based on a context selected by a user.

3. The method of claim 2, wherein the context comprises at least one of a service monitor view, a session analysis view and a packet analysis view.

4. The method of claim 1, wherein the graphical representation indicates a distribution of performance metrics related to one or more server computers amongst one or more performance metrics groups, wherein the one or more servers are configured to provide the monitored service.

5. The method of claim 1, wherein the graphical representation indicates a distribution of performance metrics related to one or more client communities amongst one or more performance metrics groups, wherein the one or more client communities are configured to access the monitored service.

6. The method of claim 1, wherein generating the graphical user interface further comprises displaying one or more interactive multidimensional pie charts having a first dimension and a second dimension and wherein the first dimension represents a primary performance metric and the second dimension represents a secondary performance metric.

7. The method of claim 6, wherein the secondary performance metric is selected by a user.

8. The method of claim 1, wherein generating the graphical user interface further comprises displaying one or more additional pie charts indicative of a performance of a user-configurable performance metric with respect to a predefined threshold.

9. The method of claim 2, further comprising the step of displaying a navigational tree to obtain the context from the user.

10. A network device for reporting service performance statistics in a network, the network device comprising:
a network interface configured to receive program instructions to receive an Adaptive Service Intelligence (ASI) data set related to a monitored service in the network from one or more network monitoring devices positioned at one or more locations in the network; and
a service monitoring engine configured to:
determine a service relationship model associated with a monitored service, the service relationship model comprising one or more service members wherein at least two of the service members are observed for a predefined time period to identify interrelated service members based upon behavior patterns of the observed service members with respect to one or more performance metrics;
analyze performance of each of the one or more service members using the received ASI data set;
identify one or more performance metrics for each of the one or more service members, wherein the identified performance metrics are indicative of corresponding service member's performance; and
generate a graphical user interface displaying a graphical representation of the identified performance metrics based on the analysis, the graphical representation providing an aggregated view indicative of performance of the one or more service members.

11. The network device of claim 10, wherein the service monitoring engine configured to analyze performance of the service members and generate the graphical user interface is further configured to analyze performance of the service members and generate the graphical user interface based on a context selected by a user.

12. The network device of claim 11, wherein the context comprises at least one of a service monitor view, a session analysis view and a packet analysis view.

13. The network device of claim 10, wherein the graphical representation indicates a distribution of performance metrics related to one or more server computers amongst one or more performance metrics groups, wherein the one or more servers are configured to provide the monitored service.

14. The network device of claim 10, wherein the graphical representation indicates a distribution of performance metrics related to one or more client communities amongst one or more performance metrics groups, wherein the one or more client communities are configured to access the monitored service.

15. The network device of claim 10, wherein the service monitoring engine configured to generate the graphical user interface is further configured to display one or more interactive multidimensional pie charts having a first dimension and a second dimension and wherein the first dimension represents a primary performance metric and the second dimension represents a secondary performance metric.

16. The network device of claim 15, wherein the secondary performance metric is selected by a user.

17. The network device of claim 10, wherein the service monitoring engine configured to generate the graphical user interface is further configured to display one or more additional pie charts indicative of a performance of a user-configurable performance metric with respect to a predefined threshold.

18. The network device of claim 11, wherein the service monitoring engine is further configured to display a navigational tree to obtain the context from the user.

19. A non-transitory computer readable storage medium structured to store instructions, the instructions when executed, cause a processor in a network device in a computer network to:
receive an Adaptive Service Intelligence (ASI) data set related to a monitored service from a plurality of interfaces;
determine a service relationship model associated with a monitored service, the service relationship model comprising one or more service members wherein at least two of the service members are observed for a predefined time period to identify interrelated service members based upon behavior patterns of the observed service members with respect to one or more performance metrics;
analyze performance of each of the one or more service members using the received ASI data set;
identify one or more performance metrics for each of the one or more service members, wherein the identified performance metrics are indicative of corresponding service member's performance; and
generate a graphical user interface displaying a graphical representation of the identified performance metrics based on the analysis, the graphical representation providing an aggregated view indicative of performance of the one or more service members.

20. The storage medium of claim 19, wherein the instructions that cause the processor to analyze performance of the service members and that cause the processor to generate the graphical user interface further cause the processor to analyze performance of the service members and generate the graphical user interface based on a context selected by a user.

\* \* \* \* \*